United States Patent
Kim et al.

(10) Patent No.: US 8,842,227 B2
(45) Date of Patent: Sep. 23, 2014

(54) LIQUID CRYSTAL DISPLAY DEVICE HAVING SENSING CAPACITOR FOR TOUCH AND METHOD FOR FABRICATING THE SAME

(75) Inventors: Cheol-Se Kim, Daegu (KR); Ji-Hyun Jung, Gyeongbuk (KR); Byung-Koo Kang, Gyeongbuk (KR); Min-Jae Lee, Daegu (KR); Hoon-Bae Kim, Seoul (KR); Seung-Seok Oh, Seoul (KR)

(73) Assignee: LG Display Co., Ltd., Seoul (KR)

( * ) Notice: Subject to any disclaimer, the term of this patent is extended or adjusted under 35 U.S.C. 154(b) by 1123 days.

(21) Appl. No.: 12/635,180

(22) Filed: Dec. 10, 2009

(65) Prior Publication Data

US 2011/0063537 A1    Mar. 17, 2011

(30) Foreign Application Priority Data

Sep. 15, 2009    (KR) .............................. 10-2009-87151

(51) Int. Cl.
- G02F 1/1335    (2006.01)
- G06F 3/045    (2006.01)
- G02F 1/1333    (2006.01)
- G06F 3/044    (2006.01)
- G06F 3/041    (2006.01)

(52) U.S. Cl.
CPC ............ *G06F 3/044* (2013.01); *G02F 1/13338* (2013.01); *G06F 3/0412* (2013.01)
USPC .............................. 349/12; 349/156; 345/174

(58) Field of Classification Search
USPC ..................................... 349/12, 156; 345/174
See application file for complete search history.

(56) References Cited

U.S. PATENT DOCUMENTS

| | | | |
|---|---|---|---|
| 2005/0116937 A1* | 6/2005 | Choi et al. | 345/173 |
| 2006/0109222 A1* | 5/2006 | Lee et al. | 345/88 |
| 2009/0058826 A1* | 3/2009 | Lee et al. | 345/173 |
| 2009/0135158 A1 | 5/2009 | Takahashi et al. | |
| 2009/0160822 A1 | 6/2009 | Eguchi et al. | |
| 2009/0180043 A1* | 7/2009 | Rho et al. | 349/12 |
| 2009/0256816 A1 | 10/2009 | Kim | |
| 2009/0295692 A1 | 12/2009 | Lee et al. | |

FOREIGN PATENT DOCUMENTS

| | | |
|---|---|---|
| JP | 2001042296 A | 2/2001 |
| JP | 2006040289 A | 2/2006 |
| JP | 2007128091 A | 5/2007 |
| JP | 2007171716 A | 7/2007 |
| JP | 2009176182 A | 8/2009 |

OTHER PUBLICATIONS

Japanese Office Action dated Feb. 8, 2012.

* cited by examiner

*Primary Examiner* — Lauren Nguyen
(74) *Attorney, Agent, or Firm* — Morgan, Lewis & Bockius LLP

(57) ABSTRACT

The liquid crystal display device includes a first substrate and a second substrate, a gate line and a data line on the first substrate to define a pixel region, a pixel transistor formed at the intersection of the gate line and the data line, a pixel electrode formed in the pixel region, a first storage capacitor connected to the pixel electrode, a switching line formed on the first substrate, a read out line formed on the first substrate, a second storage capacitor formed on the first substrate, a switching transistor including a gate electrode connected to the second storage capacitor, a drain electrode connected to the read out line, and a source electrode connected to a driving voltage line, a first column spacer formed on the second substrate, and a common electrode formed on the first column spacer thereby forming a sensing capacitor.

18 Claims, 9 Drawing Sheets

LIQUID CRYSTAL DISPLAY DEVICE HAVING SENSING CAPACITOR FOR TOUCH AND METHOD FOR FABRICATING THE SAME

This application claims the benefit of Korean Patent Application No. 10-2009-0087151, filed on Sep. 15, 2009, which is hereby incorporated by reference.

BACKGROUND OF THE INVENTION

1. Field of the Invention

The present invention relates to a liquid crystal display device, and more particularly, to a liquid crystal display device, which senses whether or not the device is touched and the position of a touched region by recognizing a variation of capacitance according to the touch, and a method for fabricating the same.

2. Discussion of the Related Art

Recently, the field of displays visually expressing electric data signals has been rapidly growing. Accordingly, various flat display devices having excellent characteristics, such as thin profile, light weight, and low power consumption, have been developed and rapidly replaced conventional cathode ray tubes (CRT).

Specifically, the flat display devices include a liquid crystal display device (LCD), a plasma display panel device (PDP), a field emission display device (FED), an electro luminescence display device (ELD). All the above flat display devices include a flat display panel to display an image. The flat display panel consists of a pair of transparent insulating substrates, which are bonded to each other with an intrinsic luminescent or polarizing material layer being interposed therebetween.

A liquid crystal display device displays an image by adjusting the light transmittance of liquid crystals using an electric field. Therefore, the liquid crystal display includes a display panel having liquid crystal cells, a backlight unit to irradiate light onto the display panel, and driving circuits to drive the liquid crystal cells.

The display panel includes a plurality of gate lines and a plurality of data lines, which intersect each other to define a plurality of unit pixel regions. Each pixel region is provided with a thin film transistor array substrate and a color filter substrate, which are disposed to be opposite to each other. Spacers are located between the two substrates to maintain a designated cell gap between the two substrates. The cell gap is filled with liquid crystals.

The thin film transistor array substrate includes the gate lines, data lines, thin film transistors, which are switching elements formed at the intersections of the gate lines and the data lines, pixel electrodes respectively formed in liquid crystal cells and connected to the thin film transistors, and an alignment layer applied to the pixel electrodes. The gate lines and the data lines receive signals from the driving circuits through their respective pad parts.

The thin film transistors supply a pixel voltage signal, supplied from the data lines in response to a scan signal supplied to the gate lines, to the pixel electrodes. The color filter array substrate includes color filters formed in liquid crystal cells, a black matrix to divide the color filters from each other and to reflect external light, a common electrode to supply common voltage to the liquid crystal cells, and an alignment layer applied to the common electrode. The thin film transistor array substrate and the color filter array substrate, which are separately manufactured, are aligned and bonded to each other. Thereafter, liquid crystals fill a gap between the two substrates. Thereafter, the inlet, through the liquid crystals are injected, is sealed.

In the liquid crystal display device, manufactured by the process described above, demand for a touch panel, which recognizes the position of a region touched by a hand or a separate input unit and correspondingly transmits a separate data, has increased. Currently, this touch panel is used in a state in which the touch panel is attached to the external surface of a liquid crystal display device. Thus, an attempt to install the touch panel within a panel in the liquid crystal display device has been made. An example of a liquid crystal display device, in which the above mentioned touch panel is installed to prevent the increase in volume caused by the attachment of a separate touch panel to the external surface of the liquid crystal display device, will be described.

Hereinafter, a related art liquid crystal display device will be described with reference to the accompanying drawings.

FIG. 1 is a schematic circuit diagram illustrating a capacitance-type liquid crystal display device according to the related art. FIG. 2 is a circuit diagram illustrating a capacitance sensor of FIG. 1 and a driving method thereof according to the related art.

As shown in FIGS. 1 and 2, the related art liquid crystal display device includes first and second substrates (not shown), which are disposed to be opposite to each other, a liquid crystal layer (not shown) filling a gap between the first and second substrates, gate lines 11 and data lines 12, which intersect each other on the first substrate to define pixel regions, and thin film transistors TFTs formed at the intersections of the gate lines 11 and the data lines 12. A common electrode CE, to which common voltage Vcom is applied, is formed over the entire surface of the second substrate, and pixel electrodes 13 are formed on the pixel regions on the first substrate.

Here, in order to sense capacitance, a first line 21, a second line 22, and a first reference voltage line RL1 to transmit first reference voltage Vref1, and a second reference voltage line RL2 to transmit second reference voltage Vref2 are formed at the outside of the pixel regions. Here, the first line 21 and the first reference voltage line RL1 are arranged to be parallel to the gate lines 11, and the second line 22 and the second reference voltage line RL2 are arranged to be parallel to the data lines 12.

The related art liquid crystal display device further includes first auxiliary capacitors Cref1 formed between the first reference voltage line RL1 and the first line 21, and first liquid crystal capacitors Clc1 formed between the first line 21 and the common electrode CE. The first auxiliary capacitors Cref1 and the first liquid crystal capacitors Clc1 are connected to each other in series. One pair of the first auxiliary capacitors Cref1 and the first liquid crystal capacitors Clc1, which are connected to each other in series, is formed to correspond to each respective pixel region.

The related art liquid crystal display device further includes second auxiliary capacitors Cref2 formed between the second reference voltage line RL2 and the second line 22, and second liquid crystal capacitors Clc2 formed between the common electrode CE and the second line 22. The second auxiliary capacitors Cref2 and the second liquid crystal capacitors Clc2 are connected to each other in series. One pair of the second auxiliary capacitors Cref2 and the second liquid crystal capacitors Clc2, which are connected to each other in series, is formed to correspond to each respective pixel region.

As shown in FIG. 2, a signal sensed by the first line 21 is amplified by an amplifier 31 provided at the end of the first line 21. In other words, the signal sensed by the first line 21 is applied to a node n1 between the auxiliary capacitor Cref and the liquid crystal capacitor Clc, and the amplifier 31 amplifies voltage Vn1 applied to the node n1 to output the output voltage Vout. Whether or not the device is touched and the position of a touched region are determined by the value of the output voltage Vout. In other words, if there is a touch onto the touch panel from the outside, the value of the liquid crystal capacitors Clc corresponding to the position of a touched region is varied, leading to a variation in the value of the voltage Vn1 of the corresponding node n1. Accordingly, the value of the output voltage Vout output through the amplifier 31 changes from the value of the output voltage Vout if there is no touch. Whether or not the device is touched and the position of the touched region are determined based on the above difference of the values of the output voltage Vout.

First and second switches sw1 and sw2 are provided at the opposite side to the output side of the node n1 between the auxiliary capacitor Cref and the liquid crystal capacitor Clc, so that signals can be selectively applied through the first and second switches sw1 and sw2. Two voltage values Vcomh and Vcoml are alternatively applied to the first and second reference voltage lines RL1 and RL2 connected to sides of the first and second auxiliary capacitors Cref1 and Cref2. Voltage $V_A$ is applied through the first switch sw1 and stored in the liquid crystal capacitor Clc, when Vcomh is applied, and then is output to the amplifier 31, when Vcoml is applied. Consequently, the output voltage Vout contains data regarding the value of the liquid crystal capacitor Clc, which is varied when touched. A variation in the output voltage Vout according to a variation in capacitance is as follows.

$$\frac{\partial V_{n1}}{\partial C_{LC}} = -\frac{C_{ref}}{(C_{ref} + C_{LC})^2} \cdot (V_{comH} - V_{comL})$$

The above related art liquid crystal display device, which recognizes a touch using a capacitance method, has several problems. First, a variation in voltage at a point corresponding to one pixel region is selectively sensed to detect whether or not the pixel is touched. Therefore, when several points are touched, it is impossible to recognize whether or not several pixels corresponding to the points are touched. Second, since a touch is sensed through positions of a touched point on the X-axis and the Y-axis, lines intersecting each other in X-axis and Y-axis directions are formed. Therefore, an increase in size of the panel is expected. Further, line resistance of the lines and parasitic capacitance between the lines increase due to the increase in size of the panel. In addition, coupling capacitance increases resulting in a decrease of the signal to noise (S/N) ratio. Accordingly, the reliability of signal detection decreases and thus, it may be difficult to recognize the touch.

SUMMARY OF THE INVENTION

Accordingly, the present invention is directed to a liquid crystal display device and a method for fabricating the same.

One object of the present invention is to provide a liquid crystal display device, which recognizes a variation in liquid crystal capacitance according to a touch, and thus is capable of sensing whether or not the device is touched and the position of a touched region, and a method for fabricating the liquid crystal display device.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the liquid crystal display device includes a first substrate and a second substrate, a gate line and a data line on the first substrate to define a pixel region, a pixel transistor formed at the intersection of the gate line and the data line, a pixel electrode formed in the pixel region, a first storage capacitor connected to the pixel electrode, a switching line formed on the first substrate, a read out line formed on the first substrate, a second storage capacitor formed on the first substrate, a switching transistor including a gate electrode connected to the second storage capacitor, a drain electrode connected to the read out line, and a source electrode connected to a driving voltage line, a first column spacer formed on the second substrate, and a common electrode formed on the first column spacer thereby forming a sensing capacitor.

In another aspect of the present invention, the touch sensing apparatus includes a first substrate and a second substrate, a sensing spacer formed on the second substrate, a sensing capacitor including a common electrode formed on the sensing spacer, a dielectric material between the first substrate and the second substrate, and a first metal pattern formed on the first substrate, a storage capacitor including a second metal pattern formed on the first substrate, an insulating film formed on the second metal pattern, and the first metal pattern, wherein the first metal pattern is formed to overlap with the second metal pattern, and a switching transistor including a gate electrode connected to the first metal pattern.

In another aspect of the present invention, the method for fabricating a liquid crystal display device includes forming a first substrate and a second substrate, forming a data line and a gate line on the first substrate to define a pixel region, forming a pixel transistor at an intersection of the gate line and the data line, forming a pixel electrode in the pixel region, forming a first storage capacitor connected to the pixel electrode, forming a switching line on the first substrate, forming a read out line on the first substrate, forming a second storage capacitor on the first substrate, forming a switching transistor including a gate electrode connected to the second storage capacitor, a drain electrode connected to the read out line, and a source electrode connected to a driving voltage line, forming a first column spacer on the second substrate, and forming a sensing capacitor including a common electrode formed on the first column spacer.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings. Hereinafter, with reference to the accompanying drawings, a liquid crystal display device in accordance with the present invention and a touch sensing method thereof will be described in detail.

Figure 1:
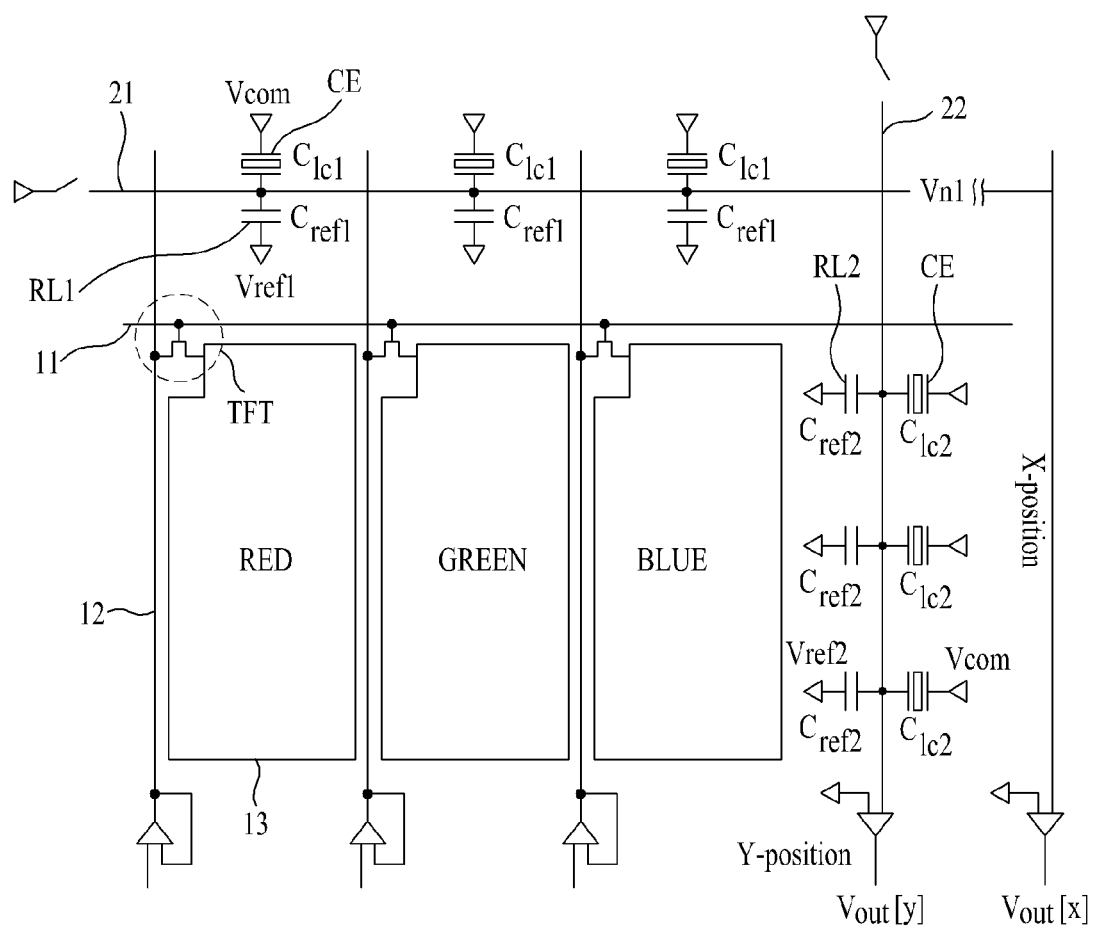
FIG. 1 is a schematic circuit diagram illustrating a related art capacitance-type liquid crystal display device.
Figure 2:
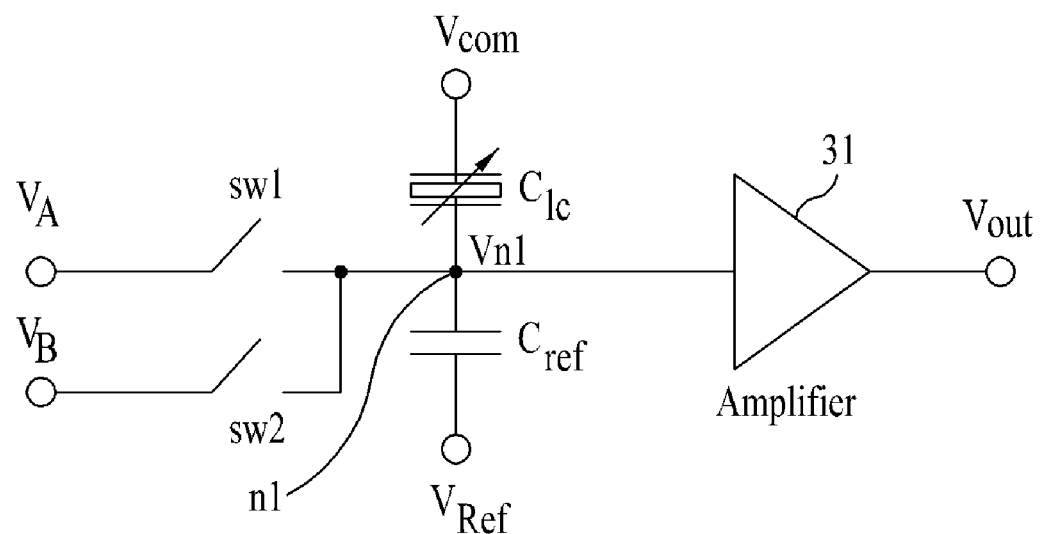
FIG. 2 is a circuit diagram illustrating a capacitance sensor of FIG. 1 and a driving method thereof.
Figure 3:
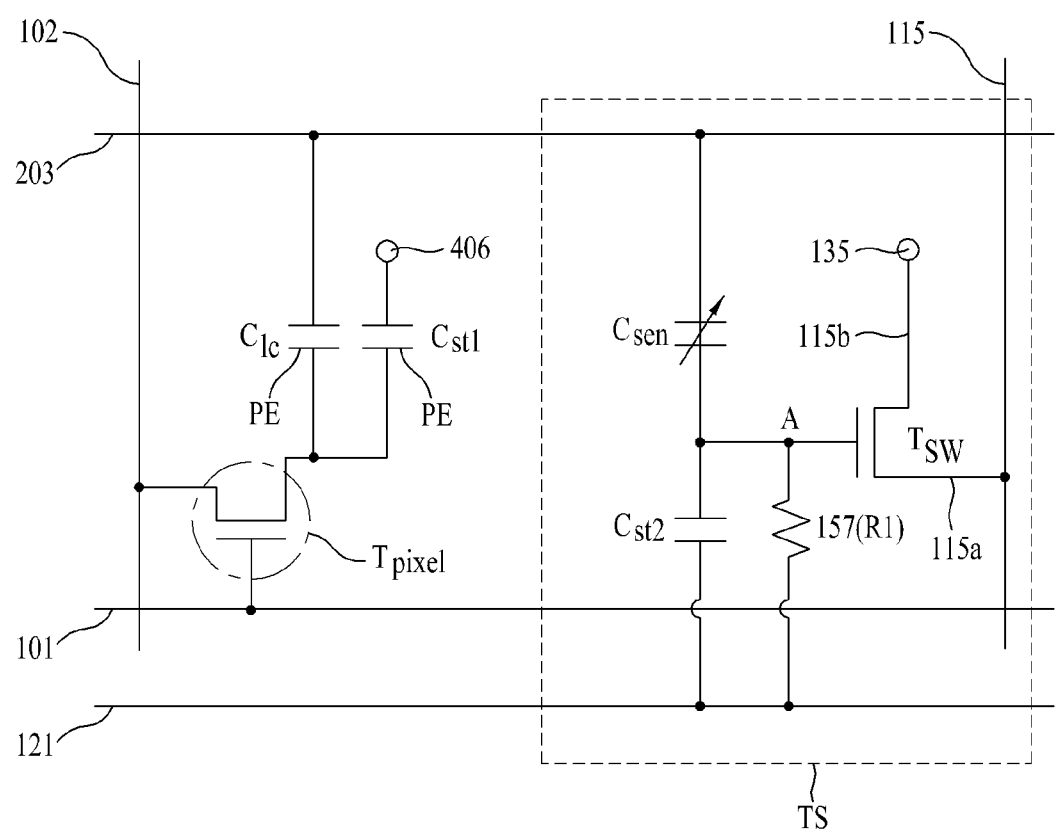
FIG. 3 is an exemplary circuit diagram illustrating a liquid crystal display device according to the present invention.
Figure 7:
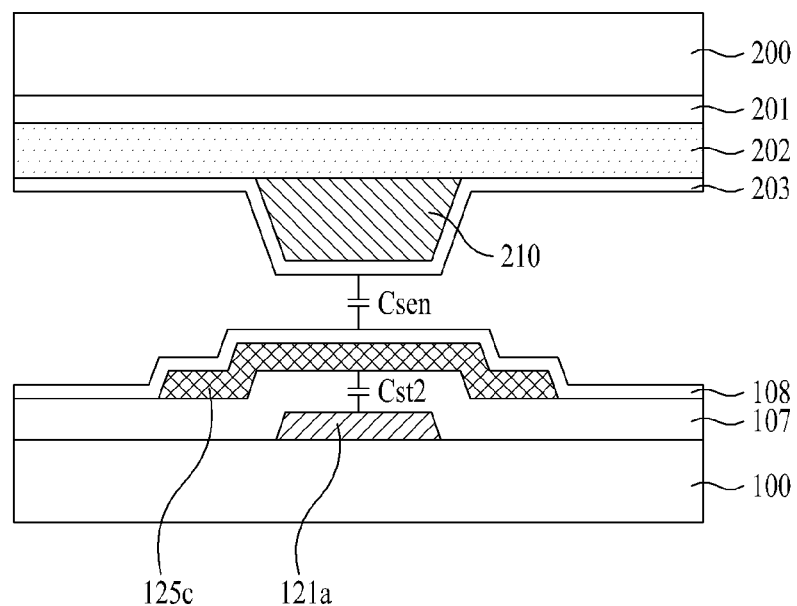
FIG. 7 is a longitudinal-sectional view of the exemplary sensor capacitor in FIG. 5.

FIG. 3 is an exemplary circuit diagram illustrating a liquid crystal display device according to the present invention and FIG. 7 is an exemplary longitudinal-sectional view illustrating the liquid crystal display device according to the present invention.

The liquid crystal display device of the present invention includes first and second substrates 100 and 200 (See FIG. 7), which are disposed to be opposite to each other, a liquid crystal layer filling a gap between the first and second substrates, a thin film transistor array formed on the first substrate 100, and a color filter array formed on the second substrate 200. The color filter array includes a black matrix layer 201 (See FIG. 7) formed in non-pixel regions, a color filter layer 202 (See FIG. 7) determining colors of respective pixel regions, and a common electrode 203 (See FIG. 7) formed over the entire surface of the second substrate 200.

The thin film transistor array includes gate lines 101 and data lines 102, which intersect each other on the first substrate 100 (See FIG. 7) to define the pixel regions, pixel transistors Tpixel formed at the intersections of the gate lines 101 and the data lines 102, liquid crystal capacitors Clc formed between drain electrodes of the pixel transistors Tpixel and the common electrode 203, and first storage capacitors Cst1 formed between the drain electrodes of the pixel transistors Tpixel and a storage line 406. Since the liquid crystal capacitor Clc and the first storage capacitor Cst1 are connected in parallel on the circuit, the liquid crystal capacitor Clc is substantially formed among the common electrode 203, a pixel electrode PE connected to the drain electrode of the pixel transistor Tpixel, and the liquid crystal layer. In addition, the first storage capacitor Cst1 is substantially formed by further interposing a gate insulating film 107 between the pixel electrode PE, connected to the drain terminal of the pixel transistor Tpixel, and the storage line 406.

The liquid crystal display device of the present invention further includes touch sensing units TS formed between switching lines 121 and the common electrode 203. Each touch sensing unit TS includes a second storage capacitor Cst2 and a sensing capacitor Csen connected in series between the switching line 121 and the common electrode 203, and a switching transistor Tsw provided with a gate electrode connected to a node A between the second storage capacitor Cst2 and the sensing capacitor Csen, a drain electrode 115a connected to a read out line 115 running parallel with the data line 102, and a source electrode 115b connected to a driving voltage line 135. Each touch sensing unit TS may further include a resistor 157 (R1) formed between the node A and the switching line 121 to stabilize a voltage value applied to the gate electrode of the switching transistor Tsw.

The touch sensing units TS may be formed in the pixels, or may be periodically formed at intervals therebetween. The positions of the touch sensing units TS may be determined by the number of the pixels located in the area of one touched region. In other words, assuming that the number of the pixels located in the area of one touched region is n, the touch sensing units TS are periodically formed at intervals of n pixels. The number n is an integer and is determined by considering the general area of a touched region and the general size of pixels.

Figure 5:
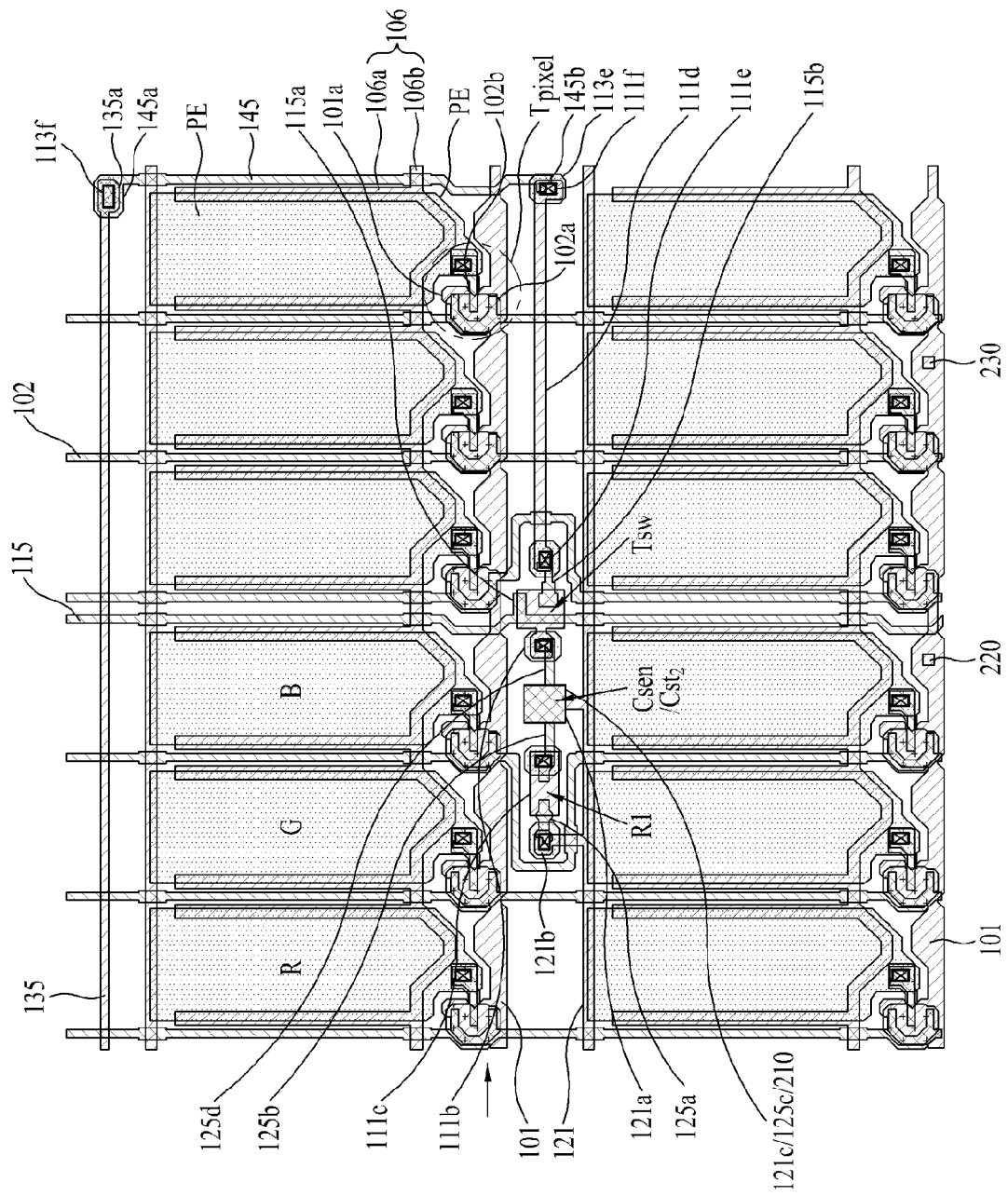
FIG. 5 is an exemplary plan view illustrating the liquid crystal display device according to the present invention.

As shown in FIG. 5, the common line 106 includes a U-shaped common line pattern 106a overlapping with the pixel electrode PE of each pixel region and a connection pattern 106b connecting the U-shaped common line patterns 106 of the respective pixel regions. The overlapping portion between the pixel electrode PE and the portion of the common line 106 that is parallel to the gate lines 101, i.e., the storage line, forms the first storage capacitor Cst1.

One electrode of the first storage capacitor Cst1 becomes the pixel electrode PE, and the other electrode of the first storage capacitor Cst1 is the common line 106. The driving voltage line 135 is a line, to which power voltage to drive the switching transistor Tsw of the touch sensing unit TS is applied. For example, the driving voltage line 135 is separately formed at the outside of the first substrate 100, and runs parallel with the gate lines 101. Further, the read out line 115 is formed to sense current flowing in the switching transistor Tsw. An amplifier to amplify the sensed current to improve sensitivity is provided at one end of the read out line 115.

The resistor 157 is configured to have a resistance value, which causes a calculated time constant (vR1·(vCsen+vCst2+vCsw)) to be shorter than a 1-frame time and be sufficiently longer than a turn-on time (1 horizontal time) of one gate high signal. Here, vCsw represents a capacitance between the gate electrode and a channel of the switching transistor Tsw, vCst2 represents a capacitance of the second storage capacitor Cst2, vCsen represents a capacitance of the sensing capacitor Csen, and vR1 represents the resistance value of the resistor R1. The time constant (vR1·(vCsen+vCst2+vCsw)) maintains the gate voltage value applied to the switching transistor Tsw for more than the turn-on time of the gate voltage signal applied to the switching transistor Tsw. Therefore, sensitivity is stably maintained when the switching transistor Tsw senses a touch, for at least the turn-on time of the switching transistor Tsw.

Power voltage applied to the driving voltage line 135 has a DC voltage value, which is not less than a regular positive voltage value, such that current flows in the switching transistor Tsw when a high signal is applied to the switching line 121. Accordingly, when a high signal is applied to the switching line 121, the switching transistor Tsw is turned on, and current flowing in the switching transistor Tsw is supplied to the read out line 115. Therefore, the read out line 115 may sense the current flowing in the switching transistor Tsw.

Scan pulses are applied to the gate electrode of the switching transistor Tsw through the switching lines 121. Initially, a low voltage (i.e., gate low voltage Vg1) is applied to the node A from the switching line 121 through the resistor 157. When the gate voltage applied to the switching line 121 is changed from the gate low voltage Vg1 to the gate high voltage Vgh, the gate voltage Vg_sw applied to the gate electrode of the switching transistor Tsw is as follows.

$$v_{g\_sw} = \frac{vCst2}{vCsen + vCst2 + vCsw}(Vgh - Vgl) + Vgl$$

Figure 4A:
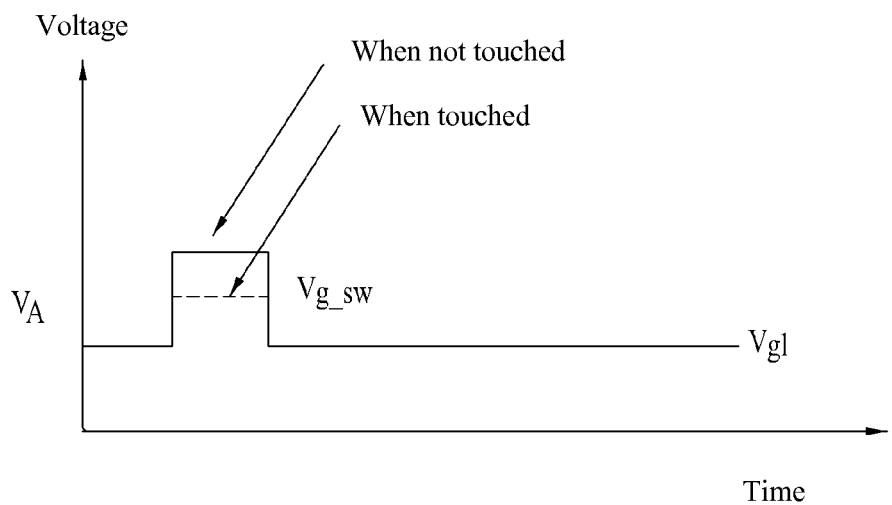
FIG. 4A is an exemplary graph illustrating timing of a variation in voltage, as seen from a gate electrode and a node A, as time passes, in the liquid crystal display device according to the present invention.
Figure 4B:
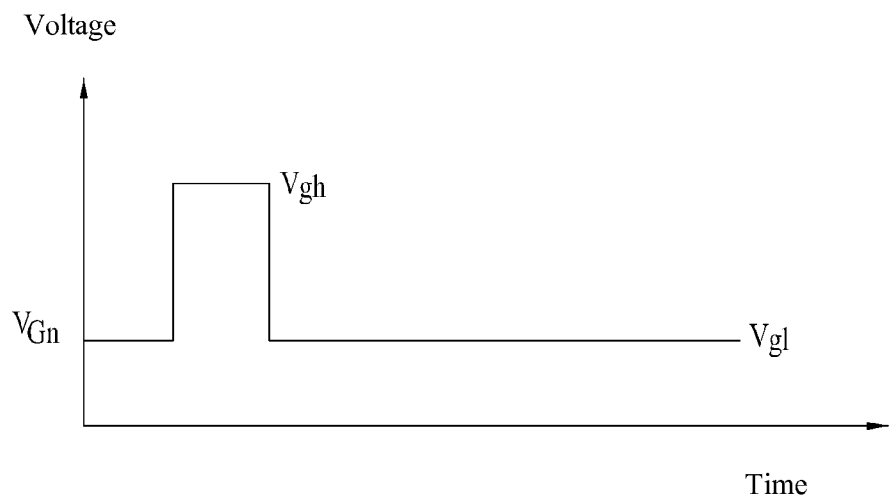
FIG. 4B is an exemplary graph illustrating timing of a variation in voltage, as applied to the switching line, as time passes, in the liquid crystal display device according to the present invention.

An operation of the touch sensing unit TS, when touched, is described hereinafter. FIG. 4A is an exemplary graph illustrating timing of a variation in voltage, as seen from a gate electrode and a node A, as time passes, in the liquid crystal display device according to the present invention. FIG. 4B is an exemplary graph illustrating timing of a variation in voltage, as applied to the switching line, as time passes, in the liquid crystal display device according to the present invention. As shown in FIG. 4A, the capacitance vCsen of the sensing capacitor 155 is increased and the gate voltage Vg_sw applied to the switching transistor Tsw is decreased when the liquid crystal panel is touched because the distance between the common electrode 203 and the node A at a touched region is reduced. Consequently, the current flowing in the read out line 115 is decreased.

Therefore, whether or not the device is touched or the position of a touched region can be determined from the current value flowing in the read out line 115 per unit time. In other words, when the present current voltage is decreased compared with the current voltage at the initial stage prior to being touched, it is determined that the device is touched. On the other hand, when the present current voltage is similar to the current voltage at the initial stage, it is determined that the device is not touched. Positions of the touched region on the X-axis and the Y-axis are respectively determined using the switching line 121 and the read out line 115, on which the sensing is performed.

Hereinafter, the liquid crystal display device with the touch sensing units in accordance with the present invention will be described in detail with reference to the accompanying drawings. FIG. 5 is an exemplary plan view illustrating the liquid crystal display device according to the present invention, FIG. 6 is an enlarged view of the exemplary sensor capacitor in FIG. 5, and FIG. 7 is a longitudinal-sectional view of the exemplary sensor capacitor in FIG. 5.

Figure 6:
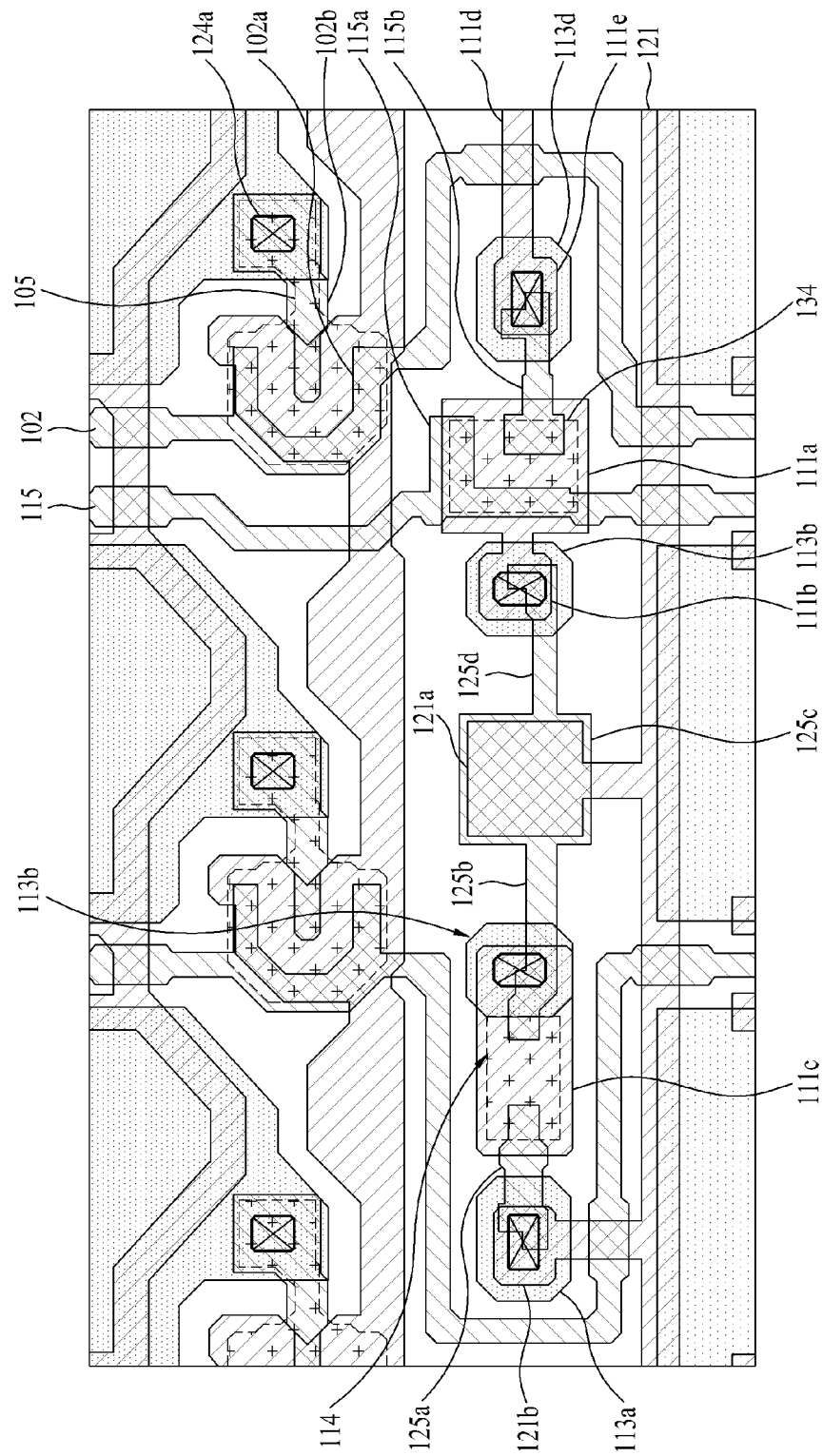
FIG. 6 is an enlarged view of the exemplary sensor capacitor in FIG. 5.

As shown in FIGS. 5 to 7, the liquid crystal display device of the present invention includes the gate lines 101 and the data lines 102, which intersect each other to define the pixel regions, the pixel electrodes PE formed in the pixel regions, and the common lines 106, which includes the U-shaped common line pattern 106a overlapping with edges of three sides of the pixel electrode PE at the peripheries of the pixel region and the connection patterns 106b connecting the U-shaped common line patterns 106, and the switching lines 121 running parallel with the gate lines 101. Further, the read out lines 115 running parallel with the gate lines 101 are formed to form the touch sensing units, and the driving voltage lines 135 running parallel with the gate lines 101 are formed at the outer peripheral portion of the liquid crystal panel. The switching lines 121 are lines, to which a switching signal, to turn on a corresponding switching transistor when a touch sensing unit TS senses a touch, is applied. The driving voltage lines 135 are lines provided to transmit a regular output value from the turned-on switching transistor Tsw.

The pixel transistors Tpixel are formed at the intersections of the gate lines 101 and the data lines 102. Each touch sensing units TS includes a second storage capacitor Cst2, the sensing capacitor Csen, a resistor R1, and a switching transistor Tsw. The touch sensing units TS are formed between the same gate line 101 and the common electrode 203 located on the second substrate 200. FIG. 6 is an enlarged view illustrating the second storage capacitor Cst2, the sensing capacitor Csen, the resistor R1, and the switching transistor Tsw of the touch sensing unit TS.

The second storage capacitor Cst2 of the touch sensing unit TS, as shown in FIGS. 6 and 7, is formed by a first protrusion pattern 121a and a data metal pattern 125c having an area overlapping with the first protrusion pattern 121a. The first protrusion patterns 121a is protruded from the switching line 121. As shown in FIG. 7, two electrodes of the second storage capacitor Cst2 are the first protrusion pattern 121a and the data metal pattern 125c. The dielectric of the second storage capacitor Cst2 is the gate insulating film 107 between the two electrodes.

The sensing capacitor Csen of the touch sensing unit TS, as shown in FIG. 7, is formed by the data metal pattern 125c and the common electrode 203 covering a sensing spacer 210 on the second substrate 200. Here, the sensing spacer 210 serves to prevent a short of the common electrode 203 with the data metal pattern 125c when external pressure is applied. The sensing spacer 210 and a passivation film 108, i.e., the uppermost surface of the first substrate 100, are separated by a designated interval. Further, two electrodes of the sensing capacitor Csen are the data metal pattern 125c and the common electrode 203. The dielectric of the sensing capacitor Csen is a combination of the passivation film 108 between the two electrodes and the liquid crystal layer between the common electrode 203 and the upper surface of the passivation film 108. The data metal pattern 125c also functions as a node between the second storage capacitor Cst2 and the sensing capacitor Csen. The data metal pattern 125c electrically contacts the gate electrode of the switching transistor Tsw.

As shown in FIG. 6, the drain electrode 115a of the switching transistor Tsw provided at the touch sensing unit TS is protruded from the read out line 115. The source electrode 115b of the switching transistor Tsw is separated from the drain electrode 115a by a designated interval. Here, the source electrode 115b of the switching transistor Tsw, as shown in FIGS. 5 and 6, receives a signal from the driving voltage line 135 through the gate extension metal 111d and driving voltage connection lines 145.

As shown in FIGS. 5 and 6, the resistor R1 includes the gate insulating film 107 (See FIG. 7) formed on a gate metal pattern 111c, a semiconductor layer 114 formed on the gate insulating film 107, and first and second data connection patterns 125a and 125b contacting both sides of the semiconductor layer 114. Here, the first data connection pattern 125a electrically contacts the second protrusion pattern 121b protruded from the switching line 121 at a first contact 113a. The second data connection pattern 125b is formed integrally with the data metal pattern 125c and electrically contacts the second gate metal pattern 111c at a second contact 113b. The semiconductor layer 114 forming the resistor R1 may be a structure obtained by stacking an amorphous silicon layer and an impurity layer. Alternatively, the semiconductor layer 114 may be a polysilicon layer. The semiconductor layer 114 of the resistor R1, the semiconductor layer 105 of the pixel transistor Tpixel, and the semiconductor layer 134 of the switching transistor Tsw can be formed in the same process using the same material.

Figure 8:
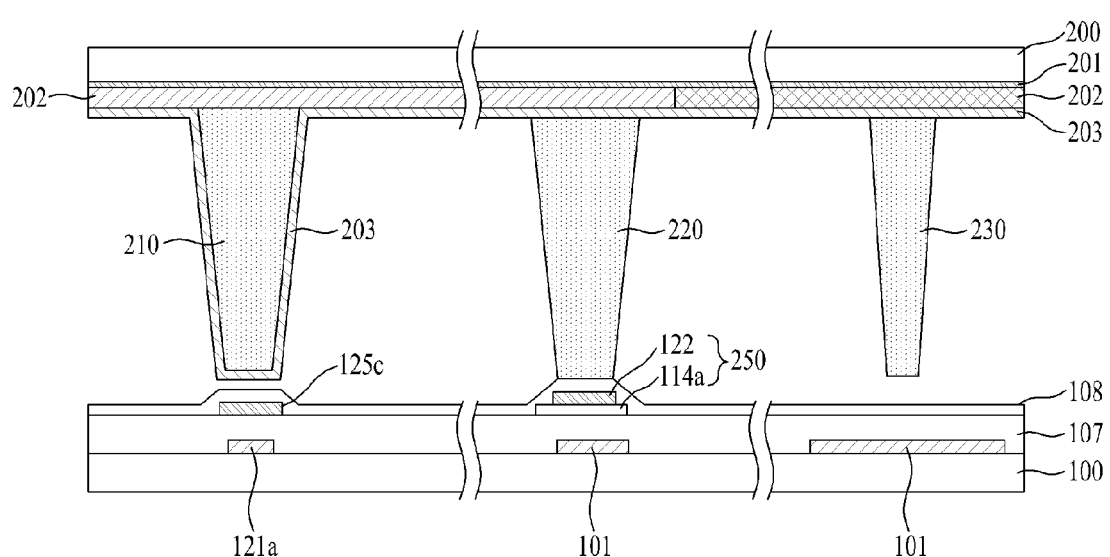
FIG. 8 is a longitudinal-sectional view illustrating various spacers of a liquid crystal display device according to the exemplary embodiment of the present invention.

As shown in FIGS. 7 and 8, the black matrix layer 201 is formed in non-pixel regions on the second substrate 200, and the color filter layer 202 are formed in pixel regions on the second substrate 200. The sensing spacers 210, gap maintenance spacers 220 (See FIG. 8), and press prevention spacers 230 (See FIG. 8) are formed on the upper surface of the color filter layer 202 corresponding to a portion of the black matrix layer 202. The common electrode 203 is formed over the entire surface of the second substrate 200 including at least the sensing spacers 210. The common electrode 203 may be formed on or under the gap maintenance spacers 220 or the press prevention spacers 230. If the common electrode 203 is formed under the gap maintenance spacers 220 or the press prevention spacers 230, a formation process of the sensing spacers 210 and a formation process of the gap maintenance spacers 220 and the press prevention spacers 230 are separately performed before and after the formation process of the common electrode 203, respectively.

As described above, it is preferable to separate the sensing spacers 210 be separated from the uppermost surface of the first substrate 100. A separation distance between the sensing spacers 210 and the uppermost surface of the first substrate 100 is maintained by having the sensing spacers 210 to have a height lower than that of the gap maintenance spacers 220 contacting the uppermost surface of the first substrate 100. Alternatively, the separate distance can be maintained by locating a structure of the first substrate 100 or the second substrate 200, at which the sensing spacers 210 are located, at a height lower than those of other regions of the first substrate 100 or the second substrate 200.

Hereinafter, a method for fabricating the liquid crystal display device in accordance with the present invention will be described in detail with reference to FIGS. 5 to 7. The pixel regions, disposed in a matrix, are defined on the first substrate 100. Touch sensing units TS corresponding to the boundaries of the pixel regions are respectively formed at intervals of n pixel regions, where n is an integer.

First, by depositing a first metal on the first substrate 100 and then selectively removing the first metal, the gate lines 101, the gate electrodes 101a, the U-shaped common line patterns 106a, the connection patterns 106b, the switching lines 121, the first protrusion patterns 121a, the second protrusion patterns 121b, gate electrode patterns 111a, the first gate metal patterns 111b, the second gate metal patterns 111c, the gate extension metals 111d, first and second driving voltage connection pads 111e and 111f, and the driving voltage lines 135 are formed. Driving voltage connection patterns 135a are formed at the sides of the driving voltage lines 135. The gate lines 101 are disposed in one direction. The gate electrodes 101a are protruded from the gate lines 101 according to the respective pixel regions. The U-shaped common line electrodes 106a overlap with edges of three sides of the pixel electrodes PE of the pixel regions arranged along the gate lines 101. The connection patterns 106b connect the neighboring U-shaped common line electrodes 106a. The switching lines 121 run parallel with the gate lines 101 corresponding to the touch sensing units. The first protrusion patterns 121a and the second protrusion patterns 121b are protruded upward from the switching lines 121. The gate electrode patterns 111a are located at the right sides of the first protrusion patterns 121a. The first gate metal patterns 111b are formed integrally with the gate electrode patterns 111a adjacent to the first protrusion patterns 121a. The second gate metal patterns 111c are located between the first and second protrusion patterns 121a and 121b. The gate extension metals 111d are located at the right sides of the gate electrode patterns 111a and are extended to the right outer lines. The first and second driving voltage connection pads 111e and 111f are located at both sides of the gate extension metals 111d. The driving voltage lines 135 run parallel with the gate lines 101 and are formed at the outermost edges of the gate lines 101.

Thereafter, the gate insulating film 107 is formed over the entire upper surface of the first substrate 100 including the gate lines 101, the gate electrodes 101a, the U-shaped common line patterns 106a, the connection patterns 106b, the switching lines 121, the first protrusion patterns 121a, the second protrusion patterns 121b, the gate electrode patterns 111a, the first gate metal patterns 111b, the second gate metal patterns 111c, the gate extension metals 111d, the first and second driving voltage connection pads 111e and 111f, and the driving voltage lines 135.

Thereafter, the semiconductor layers 105, 134, and 114 are formed by depositing an amorphous silicon layer and an impurity layer on the surface of the gate insulating film 107 and then selectively leaving the amorphous silicon layer and the impurity layer on regions for forming pixel transistors Tpixel, designated regions on the gate electrodes 101a, regions corresponding to channel regions of the switching transistors Tsw, and regions for forming the resistors R1.

Thereafter, by depositing a second metal on the gate insulating film 107 including the semiconductor layers 105, 134, and 114 and then selectively removing the second metal, the data lines 102, the read out line 115, the source/drain electrodes 102a and 102b of the pixel transistors Tpixel, the source/drain electrodes 115b and 115a of the switching transistors Tsw, the driving voltage connection lines 145, first driving voltage connection pads 145a, second driving voltage connection pads 145b, the data metal patterns 125c, second data connection patterns 125b, third data connection patterns 125d, and first data connection patterns 125a are formed.

The data lines 102 are formed to intersect the gate lines 101. The read out line 115 running parallel with the data lines 102 pass through regions for forming the touch sensing units TS. The source electrodes 102a of the pixel transistors Tpixel are protruded from the data lines 102. The drain electrodes 102b of the pixel transistors Tpixel are separated from the source electrodes 102a by a designated interval. The source electrodes 115b of the switching transistors Tsw are protruded from the read out lines 115. The drain electrode patterns 115a of the switching transistors Tsw are separated from the source electrode patterns 115b by a designated interval. The first driving voltage connection pads 145a located at ends of the driving voltage connection lines 145 overlap the driving voltage connection line patterns 135a. The second driving voltage connection pads 145b located at the other ends of the driving voltage connection lines 145 overlap the second extension line pads 111f. The data metal patterns 125c adjoin both data lines and the read out lines 115 of the touch sensing units TS and overlap the first protrusion patterns 121a. The second data connection patterns 125b and the third data connection patterns 125d are respectively protruded from both sides of the data metal patterns 125c and partially overlap the second gate metal patterns 111c and the first gate metal patterns 111b. The first data connection patterns 125a partially overlap the second protrusion patterns 121b and the second gate metal pattern 111c at both sides.

Thereafter, by over-etching the semiconductor layer during patterning the second metal, the impurity layer of the semiconductor layers 105 and 134 under regions between the source electrodes 102a and the drain electrodes 102b of the pixel transistors and between the source electrodes 115b and the drain electrodes 115a of the switching transistors Tsw is removed, thereby defining channels.

Thereafter, a passivation film 108 is formed over the entire surface of the gate insulating film 107 including the data lines 102, the read out lines 115, the source electrodes 115b and the drain electrodes 115a of the switching transistors Tsw, the source electrodes 102a and the drain electrodes 102b of the pixel transistors Tpixel, the data metal patterns 125c, and the first to third data connection patterns 125a, 125b, and 125d.

Thereafter, contact holes 124a and first to sixth contacts 113a, 113b, 113c, 113d, 113e, and 113f are formed by selectively removing the passivation film 108 and the gate insulating film 107. Here, the contact hole 124a is defined to expose the drain electrodes 102b by removing the passivation film 108. The first to sixth contacts 113a~113f are defined to expose both the upper surface of the gate metal layer and the side surface of the data metal layer overlapping with each other by removing the passivation film 108 and the gate insulating film 107.

Thereafter, the pixel electrodes PE filling the contact holes 124a and corresponding to the respective pixel regions, and pixel electrode patterns in the first to sixth contacts 113a~113f connected with the corresponding gate metal layer (first metal) and data metal layer (second metal) are formed by depositing a transparent metal over the entire surface of the passivation film 108 including the contact holes 124a and the first to sixth contacts 113a~113f and selectively removing the transparent metal thereafter.

Hereafter, positions of the sensing spacers, where the sensing capacitors are respectively formed, and the remaining spacers and a relation between the first and second substrates will be described. In the exemplary embodiments which will be described below, first substrates 100 of the respective embodiments have the same configuration. However, second substrates 200 of the respective embodiments have different configurations in each embodiment.

FIG. 8 is a longitudinal-sectional view illustrating various spacers of a liquid crystal display device according to the exemplary embodiment of the present invention. As shown in FIG. 8, the liquid crystal display device according to one embodiment includes a first substrate 100 and a second substrate 200, which are disposed to be opposite to each other. The liquid crystal display device further includes a plurality of gate lines 101 and a plurality of data lines 102 (in FIG. 5), which intersect each other on the first substrate 100 to define pixel regions. The liquid crystal display device further includes pixel transistors Tpixel (in FIG. 5), which are formed at the intersections of the gate lines 101 and the data lines 102. The liquid crystal display device further includes pixel electrodes PE, which are formed in the pixel regions. The liquid crystal display device further includes switching lines 121 and driving voltage lines 135, which run parallel with the gate lines 101. The liquid crystal display device further includes read out lines 115, which runs parallel with the data lines 102. The liquid crystal display device further includes first protrusion patterns, which are protruded from the switching lines 121. The liquid crystal display device further includes data metal patterns 125c, which overlap with the first protrusion patterns 121a. The liquid crystal display device further includes switching transistors Tsw, which are connected between the data metal patterns 125c and the driving voltage lines 135. The liquid crystal display device further includes gap maintenance spacers 220 to maintain a gap between the first and second substrates 100 and 200. The liquid crystal display device further includes sensing spacers 210 located above the data metal patterns 125c. The liquid crystal display device further includes a common electrode 203, which is formed on the substrate 200 to cover the sensing spacers 210. The liquid crystal display device further includes a liquid crystal layer filling the gap between the first and second substrates 100 and 200.

In addition to the gap maintenance spacers 220, press prevention spacers 230 may be further provided. The press prevention spacers 230 are separated from the uppermost surface of the first substrate 100 to support the gap between the first and second substrates 100 and 200 together with the gap maintenance spacers 220 when an external pressure is applied. As shown in FIG. 5, each switching transistor Tsw includes the gate electrode pattern 111a connected to the data metal pattern 125c, the drain electrode 115a connected to the read out line 115, and the source electrode 115b connected to the driving voltage line 135.

The position of the sensing spacer 210 will be described hereinafter. A second storage capacitor Cst2 is formed by interposing a gate insulating film 107 between the switching line 121 and the data metal pattern 125c. A sensing capacitor Csen is formed between the data metal pattern 125c and the common electrode 203 on the sensing capacitor 210. Here, the common electrode 203 on the sensing spacer 210 is separated from the data metal pattern 125c. In other words, the structure of the sensing spacer 210 differs from that of the gap maintenance spacer 200 contacting the passivation film 108, i.e., the uppermost surface of the first substrate 100. As shown in FIG. 8, a dual film conductor 250 consisting of a stack of a semiconductor layer 114a and a data line metal pattern 122 are formed on the gate insulating film 107, which is formed on the gate line 101. The dual film conductor 250 is located under the gap maintenance spacer 220, thereby causing a difference of heights between the gap maintenance spacer 220 and the sensing spacer 210. Alternatively, the sensing spacers 210 may be formed after the formation of the common electrode 203 so as to have a height differing from that of the gap maintenance spacers 220 and the press prevention spacers 230, which are formed before the formation of the common electrode 203. In other words, the sensing spacers 210 may be formed to have a height sufficiently lower than that of the gap maintenance spacers 220, and thus a separation distance of the sensing spacers 210 from the passivation film 108 on the data metal patterns 125c may be increased.

Further, the press prevention spacers 230 can have the same height as that of the gap maintenance spacers 220. However, since the dual film conductor 250 on the first substrate 100 is not located under the press prevention spacers 230, the press prevention spacers 230 may be separated from the passivation film 108, i.e., the uppermost surface of the first substrate 100. In this case, the separation distance between the common electrode 203, corresponding to the sensing spacers 210, and the passivation film 108 may be longer than that between the press prevention spacers 230 and the passivation film 108.

Figure 9:
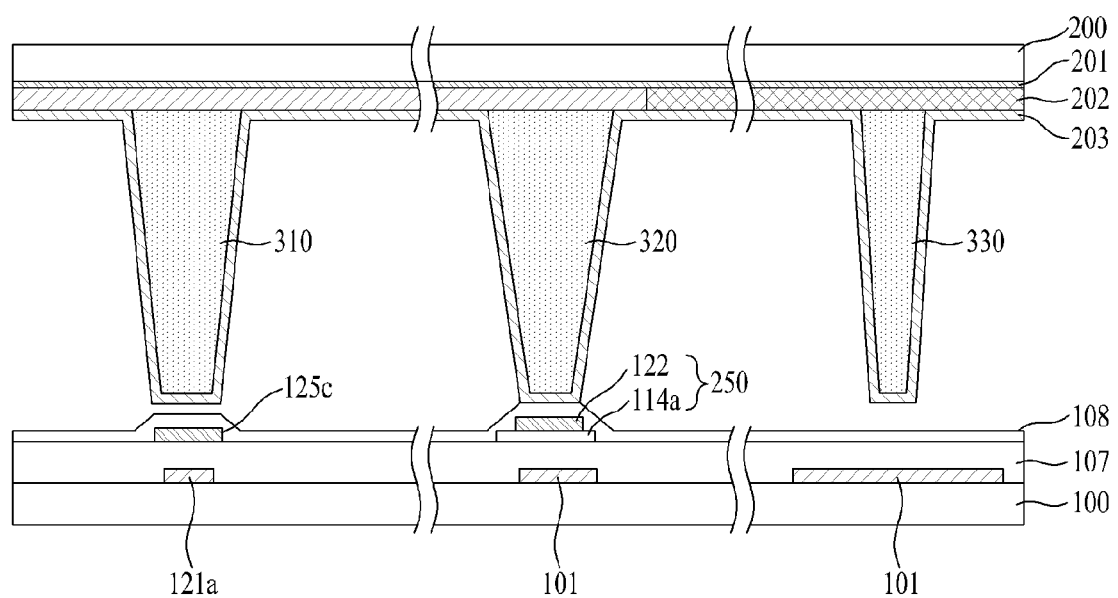
FIG. 9 is a longitudinal-sectional view illustrating various spacers of a liquid crystal display device according to another exemplary embodiment of the present invention.

FIG. 9 is a longitudinal-sectional view illustrating various spacers of a liquid crystal display device according to another exemplary embodiment of the present invention. As shown in FIG. 9, in the liquid crystal display device according to this embodiment, a common electrode 203 is formed after formation of sensing spacers 310, gap maintenance spacers 320, and press prevention spacers 330, by the same process, so as to cover all the spacers 310, 320, and 330.

The sensing spacers 310, the gap maintenance spacers 320, and the press prevention spacers 330 may be formed to have the same height by the same process, as shown in FIG. 9. If the respective spacers 310, 320, and 330 are formed to have the same height, a dual film conductor 250 consisting of a stack of a semiconductor layer 114a and a data line metal pattern 122 is provided at regions on the first substrate 1 corresponding to the gap maintenance spacers 320, and the regions on the first substrate 100 corresponding to the gap maintenance spacers 320 are protruded upward. Thus, when the first and second substrates 100 and 200 are bonded, only the gap maintenance spacers 320 of the second substrate 200 contact the surface of the passivation film 108 on the first substrate 100. Other regions of the second substrate 200 are separated from the surface of the passivation film 108 on the first substrate 100.

Alternatively, the gap maintenance spacers 320 may be formed at a high height while the sensing spacers 310 and the press prevention spacers 330 are formed at a low height using a half tone mask process. In particular, the half tone mask process may be carried out such that the height of the sensing spacers 310 is relatively low so as to avoid contact of the sensing spacers 310 directly with the passivation film 108, when the sensing spacers 310 are pressed when the first and second substrates 100 and 200 are bonded.

In the liquid crystal display device having the above-described touch sensing units TS, when one gate line is selectively turned on, the read out line 115 of the corresponding touch sensing unit TS senses current. Although the read out line 115 is provided only in the direction of the data lines, it is possible to sense positions of a touched region both in the X-direction and the Y-direction by detecting which gate line is turned on when the sensing unit TS senses the current. In addition, the liquid crystal display device according to embodiments of the present invention has the following advantages when compared to related art liquid crystal display devices.

First, related art capacitance-type touch sensing liquid crystal display device provided with lines (read out lines) disposed in the directions of the X-axis and the Y-axis has a large parasitic capacitance between lines. In contrast, the liquid crystal display device of the present invention is provided with the read out lines disposed only in a direction parallel with the data lines. Therefore, the liquid crystal display device of the present invention is capable of achieving optimization in structure and reducing parasitic capacitance between lines. The standard for determining whether or not the device is touched when a switching transistor senses current depends on the parasitic capacitance of elements provided on the liquid crystal display device. For example, when a signal to noise (S/N) ratio is high, the device can be determined to have been touched even when a variation ΔCsen in the capacitance of the sensing capacitor is low, e.g., 10~20%. However, when the S/N ratio is low, the device may not be determined to have been is touched until a variation ΔCsen in the capacitance of the sensing capacitor becomes high, e.g., 20% or more. The liquid crystal display device of the present invention optimizes the constitution of the touch sensing units and the read out lines to lower the parasitic capacitance level and raise the S/N ratio of the panel. Thus, it is possible to determine that the device is touched even when a variation ΔCsen in the capacitance of the sensing capacitor is approximately 10~20%. Because the liquid crystal display device according to the present invention is capable of reducing parasitic capacitance between lines, the liquid crystal display device according to the present invention is capable of stably sensing a touch.

Second, the liquid crystal display device of the present invention is formed integrally with a liquid crystal panel and thus is capable of sensing a touch without attachment of a separate touch panel. The liquid crystal display device of the present invention includes touch sensors installed within the liquid crystal panel and thus is capable of achieving a light weight and a thin profile, compared with a liquid crystal display device including sensors attached to the external surface thereof. Accordingly, the liquid crystal display device of the present invention can reduce production costs.

Third, the liquid crystal display device of the present invention includes sensor capacitors to sense a touch, which are obtained by forming a common electrode on spacers formed in liquid crystal cells and changing a structure on a lower substrate. Therefore, it is possible to form the sensor capacitors without a separate process of defining the sensor capacitors, which requires separate regions for forming the sensor capacitors.

Fourth, the liquid crystal display device of the present invention is stably used without the effects of external light, which differs from a photo-type touch sensing liquid crystal display device.

It will be apparent to those skilled in the art that various modifications and variations can be made in the liquid crystal display device and method for fabricating the same of the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
 a first substrate;
 a second substrate;
 a gate line and a data line on the first substrate to define a pixel region;
 a pixel transistor formed at the intersection of the gate line and the data line;
 a pixel electrode formed in the pixel region;
 a first storage capacitor connected to the pixel electrode;
 a switching line formed on the first substrate;
 a read out line formed on the first substrate;
 a second storage capacitor formed on the first substrate, directly connected to the switching line, the second storage capacitor including:
  a first protrusion pattern directly protruding from the switching line;
  a gate insulating film directly contacting the first protrusion pattern; and
  a data metal pattern directly contacting the gate insulating film;
 a switching transistor, including:
  a gate electrode connected to the second storage capacitor;
  a drain electrode connected to the read out line; and
  a source electrode connected to a driving voltage line;
 a first column spacer formed on the second substrate; and
 a common electrode formed on the first column spacer forming a sensing capacitor between the common electrode and an end of the second storage capacitor, the sensing capacitor including a passivation film directly contacting the data metal pattern,
 wherein the second storage capacitor and the sensing capacitor are connected in series between the switching line and the common electrode.

2. The liquid crystal display device of claim 1, wherein the first protrusion pattern overlaps with the data metal pattern.

3. The liquid crystal display device of claim 1, further including a resistor connected to the gate electrode of the switching transistor and the switching line.

4. The liquid crystal display device of claim 1, further comprising:
 a black matrix layer formed on a non-pixel region of the second substrate;

a color filter layer formed in the pixel region of the second substrate;

a second column spacer formed on the second substrate to maintain a gap between the first substrate and the second substrate;

a third column spacer formed on the second substrate to prevent pressing; and a liquid crystal layer filling the gap formed between the first substrate and the second substrate.

5. The liquid crystal display device of claim 4, wherein the sensing capacitor further includes the common electrode, the liquid crystal layer, and the data metal pattern.

6. The liquid crystal display device of claim 4, wherein the common electrode is formed on the second and third column spacers.

7. The liquid crystal display device of claim 4, wherein the second and third column spacers are formed on the common electrode.

8. The liquid crystal display device of claim 4, wherein a height of the second column spacer is identical to a height of the first column spacer and a height of the third column spacer.

9. The liquid crystal display device of claim 4, wherein a height of the second column spacer is larger than a height of the first column spacer.

10. The liquid crystal display device of claim 4, wherein a height of the second column spacer is larger than a height of the third column spacer.

11. A method for fabricating a liquid crystal display device comprising:
    forming a first substrate and a second substrate;
    forming a data line and a gate line on the first substrate to define a pixel region;
    forming a pixel transistor at an intersection of the gate line and the data line;
    forming a pixel electrode in the pixel region;
    forming a first storage capacitor connected to the pixel electrode;
    forming a switching line on the first substrate;
    forming a read out line on the first substrate;
    forming a second storage capacitor on the first substrate, directly connected to the switching line, the forming of the second storage capacitor including:
        forming a first protrusion pattern directly protruding from the switching line;
        forming a gate insulating film directly contacting the first protrusion pattern; and
        forming a data metal pattern directly contacting the gate insulating film;
    forming a switching transistor, including:
        a gate electrode connected to the second storage capacitor
        a drain electrode connected to the read out line; and
        a source electrode connected to a driving voltage line;
    forming a first column spacer on the second substrate; and
    forming a sensing capacitor including;
        a common electrode formed on the first column spacer between the common electrode and an end of the second storage capacitor; and
        a passivation film directly contacting the data metal pattern,
    wherein the second storage capacitor and the sensing capacitor are connected in series between the switching line and the common electrode.

12. The method of claim 11, wherein the first protrusion pattern is formed to overlap with the data metal pattern.

13. The method of claim 11, further including forming a resistor connected to the gate electrode of the switching transistor and the switching line.

14. The method of claim 11, further comprising:
    forming a black matrix layer in a non-pixel region of the second substrate;
    forming a color filter layer in the pixel region of the second substrate;
    forming a second column spacer on the second substrate to maintain a gap between the first substrate and the second substrate;
    forming a third column spacer on the second substrate to prevent pressing; and
    forming a liquid crystal layer filling the gap between the first substrate and the second substrate.

15. The method of claim 14, wherein the common electrode is formed on the second and third column spacers.

16. The method of claim 14, wherein the second and third column spacers are formed on the common electrode.

17. The method of claim 14, wherein a height of the second column spacer is formed to be identical to a height of the first column spacer and the third column spacer.

18. The method of claim 14, wherein a height of the second column spacer is formed to be larger than a height of the first and third column spacers using a half tone mask process.

* * * * *